(12) United States Patent
Su et al.

(10) Patent No.: US 10,255,013 B2
(45) Date of Patent: Apr. 9, 2019

(54) UPLOADING SCREENSHOTS TO AN APPLICATION STORE FOR MULTIFUNCTION PERIPHERALS

(71) Applicants: Kabushiki Kaisha Toshiba, Minato-ku (JP); Toshiba TEC Kabushiki Kaisha, Shinagawa-ku (JP)

(72) Inventors: William Su, Riverside, CA (US); Allen Ma, Irvine, CA (US); Jia Zhang, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/712,807

(22) Filed: Sep. 22, 2017

(65) Prior Publication Data

US 2018/0113660 A1  Apr. 26, 2018

(51) Int. Cl.
 H04N 1/04  (2006.01)
 G06F 3/12  (2006.01)
 G06F 21/60  (2013.01)
 H04L 29/06  (2006.01)
 H04N 1/44  (2006.01)
 H04N 1/00  (2006.01)
 H04L 29/08  (2006.01)

(52) U.S. Cl.
 CPC ......... *G06F 3/1272* (2013.01); *G06F 3/1284* (2013.01); *G06F 21/608* (2013.01); *H04L 63/08* (2013.01); *H04N 1/00244* (2013.01); *H04N 1/00411* (2013.01); *H04N 1/4413* (2013.01); *H04L 65/4023* (2013.01); *H04L 67/02* (2013.01); *H04L 69/329* (2013.01); *H04N 2201/0094* (2013.01)

(58) Field of Classification Search
 CPC ............ H04N 1/4413; H04N 1/00244; H04N 1/00411; G06F 3/1272; G06F 3/1284
 USPC ....................................................... 358/1.15
 See application file for complete search history.

(56) References Cited

U.S. PATENT DOCUMENTS

2012/0240065 A1* 9/2012 Linietsky .................. G06F 8/61
                                                715/762
2014/0344658 A1* 11/2014 Srinivasan .......... G06F 17/2235
                                                715/205
2016/0119491 A1* 4/2016 Takeda ............... H04N 1/00244
                                                358/1.15

OTHER PUBLICATIONS

"Steam Screenshots Feature Now in Beta", Feb. 1, 2011, Valve. (Year: 2011).*

(Continued)

*Primary Examiner* — Houshang Safaipour
(74) *Attorney, Agent, or Firm* — Ulmer & Berne LLP

(57) ABSTRACT

A system and method for transmitting screenshots from a multifunction peripheral to detail pages for downloadable applications on an application store includes a selectively enabled key on the multifunction peripheral that allows a user to capture a screenshot of an application that is executing on the multifunction peripheral, and a controller of the multifunction peripheral that is configured to generate the screenshot and metadata identifying the executing application associated with the screenshot. The controller sends the screenshot and the metadata to the application store which uses the metadata to determine which detail page is associated with the executing application. The application store then adds the screenshot to the identified detail page.

14 Claims, 8 Drawing Sheets

(56) References Cited

OTHER PUBLICATIONS

"Steam (software)", retrieved May 6, 2011, Wikipedia. (Year: 2011).*

* cited by examiner

UPLOADING SCREENSHOTS TO AN APPLICATION STORE FOR MULTIFUNCTION PERIPHERALS

TECHNICAL FIELD

This application relates generally to customization of multifunction peripherals. The application relates more particularly to taking a screenshot of the user interface of a multifunction peripheral and adding the screenshot to the detail page associated with a downloadable application of an application store.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFP means any of the forgoing.

MFPs are typically provided with a fixed set of functions, such as printing, copying, scanning and e-mailing, that are available to device end users. MFPs can include options such as hole punching or stapling, printing in black and white or in color, and scanning to an image file or a text-inclusive file via optical character recognition. These, and other options, are typically selectable by device users via a user interface, such as a touchscreen display integrated into an MFP.

MFPs are configurable computing devices that can execute applications to extend the default printing, copying, scanning, and emailing capabilities. MFPs have limited memory for storing applications, and therefore administrators generally install applications on MFPs only when needed by end users. Different users may desire to have different applications, or use customized user interface options, that are available for download onto MFPs using an associated application store. Users can be hesitant to download new applications or customized user interfaces from the application store if they do not fully know what they would be downloading.

Adding example pictures of applications and customized user interfaces can assist users in finding suitable applications to download, but capturing suitable screenshots to use as pictures can be labor intensive and time consuming for programmers and system administrators. Further, every time that applications and customized user interfaces are updated the example pictures may need to be updated and refreshed as well, requiring additional work by programmers and system administrators. For example, to obtain a screenshot from an MFP to use as an example picture, a programmer or system administrator manually inserts a USB thumbdrive into an administrative USB port of the MFP. The USB thumbdrive executes a script to capture one or more screenshots from desired screens. The programmer or system administrator then takes the USB thumbdrive back to a personal computer and use a suitable program to manually upload the screenshots from the USB to the appropriate application in the MFP app store. This process is time consuming and can result in errors if the appropriate detail page for the application is not correctly identified by the programmer or administrator.

SUMMARY

In accordance with an example embodiment of the subject application, a system and method for uploading screenshots captured on a multifunction peripheral and transmitted to an application store includes a controller having a processor and memory configured to execute a selected application from memory and selectively capture a screenshot of the display of the multifunction peripheral while the application is executing. The controller captures the screenshot in response to an input received from a selectively enabled user input, such as a specific key associated with the display unit of the multifunction peripheral. The user input is selectively enabled only for users having administrative privileges, which is determined when the user logs into the multifunction peripheral and application store. Once the controller captures the screenshot, the controller transmits the screenshot and metadata identifying the application associated with the screenshot to the application store. The application store uses the metadata to determine the specific detail page associated with the application and adds the screenshot to the detail page.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

MFPs are increasingly powerful and capable of performing advanced functions in addition to printing, faxing, emailing, and scanning. Applications can be loaded onto MFPs to enable additional functionality on MFPs. To take advantage of this additional functionality, applications can be selectively loaded onto the MFP and executed by users. However, users generally want to visually see example screenshots of the applications before expending the effort to download the applications onto their MFP. Example screenshots of applications and customized user interfaces can be added to a detail page associated with each application, however generating and adding screenshots can be labor intensive. To facilitate generating screenshots for the detail pages, a selectively enabled key associated with the user interface of the MFP allows administrators to execute an application, press the selectively enabled key to take a screenshot while the application is executing, and automatically upload the screenshot to the associated detail page for the executing application.

Figure 1:
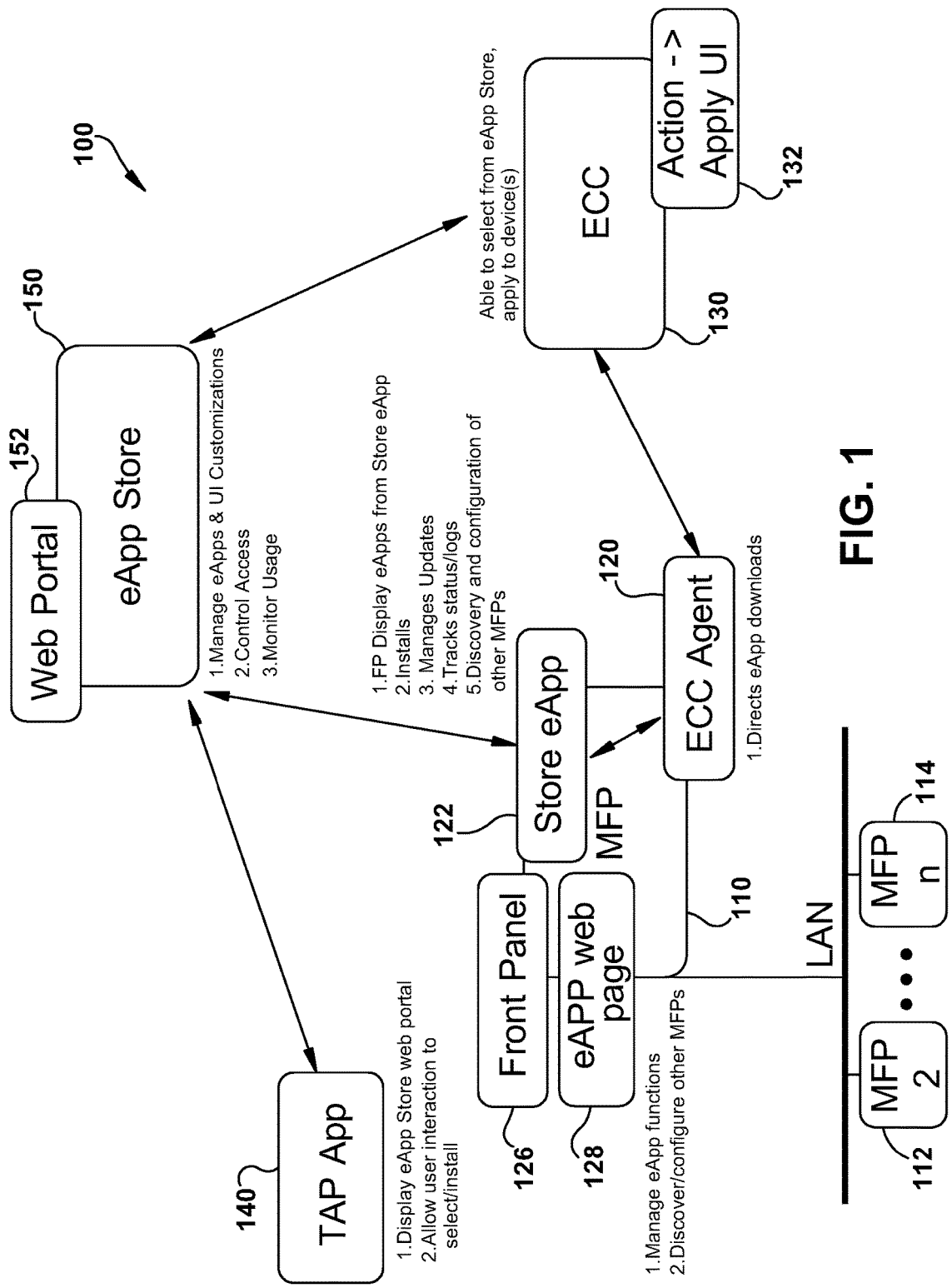
FIG. 1 is an example embodiment of an electronic business network for downloading applications and customized user interfaces to MFPs.

Referring to FIG. 1, an embodiment of an electronic business network 100 for downloading applications and customized user interfaces onto MFPs is presented. One or more MFPs 110, 112, 114 are in data communication with servers associated with the electronic business network 100 via network 102. Network 102 is suitably comprised of a local area network (LAN) as shown, a wide area network (WAN), which may include the global Internet, or any suitable combination thereof.

By installing and executing a suitable application on MFP 110, MFP 110 can communicate with an application server to download applications and customized user interfaces, such as eApp Store 150. A web portal 152 on the eApp Store 150 can serve eApp web pages 128 that are displayed on the front panel display 126 of the MFP 110. A user can interact with the eApp Store 150 through the front panel display 126 to select, download, and install applications and customized user interfaces on the MFP 110. In a configuration, an administrator can discover and configure other MFPs 112, 114 through the front panel display 126 of the MFP 110. An application distribution server, such as TAP 140 from Toshiba Australia, can similarly access the eApp Store, for example through the web portal 152, to select and install eApps and customized user interfaces on MFPs 110.

A Store eApp Agent 122, provides an interface between the eApp Store 150 and the MFP 110. The Store eApp Agent 122 initiates a connection to the eApp Store 150 when launched. The first time that the Store eApp Agent 122 connects to the eApp Store 150, the Store eApp Agent 122 registers with the eApp Store 150. The Store eApp Agent 122 can use a registration token or another suitable authentication method for subsequent connections with the eApp Store 150. Once registered, the Store eApp Agent 122 will send information about the MFP 110 to the eApp Store 150, such as the serial number of the MFP 110, the model of the MFP 110, and a list of installed applications and user interfaces on the MFP 110. The Store eApp Agent 122 controls what is displayed on the front panel display 126 to users. Once the Store eApp Agent 122 has registered or reconnected to the eApp Store 150, the Store eApp Agent 122 can display a properly formatted storefront for the eApp Store 150 and display content available for download by the user to the MFP 110. The Store eApp Agent 122 can install applications, or eApps, selected by the user from the eApp Store 150 onto the MFP 110. If a license key is required, the Store eApp Agent 122 can prompt as needed and the eApp Store 150 can confirm the license key against a license server (not shown) as would be understood in the art. The Store eApp Agent 122 can provide a progress bar or status indicator to the user, for example on the front panel display 126, that can allow a user to cancel a download if desired.

Once downloaded and installed, the eApp can be displayed on the front panel display 126, selected by the user, and executed. The Store eApp Agent 122 can manage updates to eApps and customized user interfaces. The Store eApp Agent 122 can present a list of available updates to the user via the front panel display 126 that the user can select for installation on the MFP 110. In a configuration, the Store eApp Agent 122 can restore deleted customizations or provide back-up functions. The Store eApp Agent 122 can track or log actions, as well as manage the discovery and configuration of other MFPs 112, 114. For example, the Store eApp Agent 122 can discover other MFPs 112, 114 on the local network 102, display the results to a user, receive user selections, and push updates to one or more of the MFPs 112, 114, for example to clone the functions of the MFP 110 to other MFPs 112, 114.

The MFP 110 can communicate with a device management server of the electronic business network 110, such as eBRIDGE CloudConnect (ECC 130) of Toshiba TEC. An ECC agent 120 executing on the MFP 110 provides a communications interface to the ECC 130. The Store eApp Agent 122 first subscribes to the ECC agent 120. The ECC agent 120 can notify the Store eApp Agent 122 of updates when available. The Store eApp Agent 122 can receive update instructions from the ECC agent 120. The Store eApp Agent 122 can process the updates, and provide status back to the ECC agent 120. The ECC agent 120 reports status back to the ECC 130. In an example operation, an administrator instructs the ECC 130 to perform an action 132, for example to apply a particular user interface to the MFP 110. The ECC agent 120 receives the selected user interface from the ECC 130 and Store eApp Agent 122 applies the designated user interface to the MFP 110. In a configuration, the ECC agent 120 can poll the ECC 130, for example to obtain updates to applications and customized user interfaces. The ECC 130 can track pending downloads, completed downloads, updates to eApps, and failed downloads. The ECC 130 can keep a log of eApps and customized user interfaces that have been installed to MFPs 110, including a timestamp of each installation, and can keep track of which versions of eApps have been installed on MFPs 110.

The ECC 130 can also communicate with the eApp Store 150, for example to download a particular application, or a customized user interface, that is then pushed out to one or more MFPs 110. The eApp Store 150 provides an online repository of applications, or eApps, and customized user interfaces and that can be downloaded to MFPs 110. The eApp Store 150 can manage updates of eApps and user interfaces, provide control of access to eApps and user interfaces, track status of downloads and generate logs.

Figure 2:
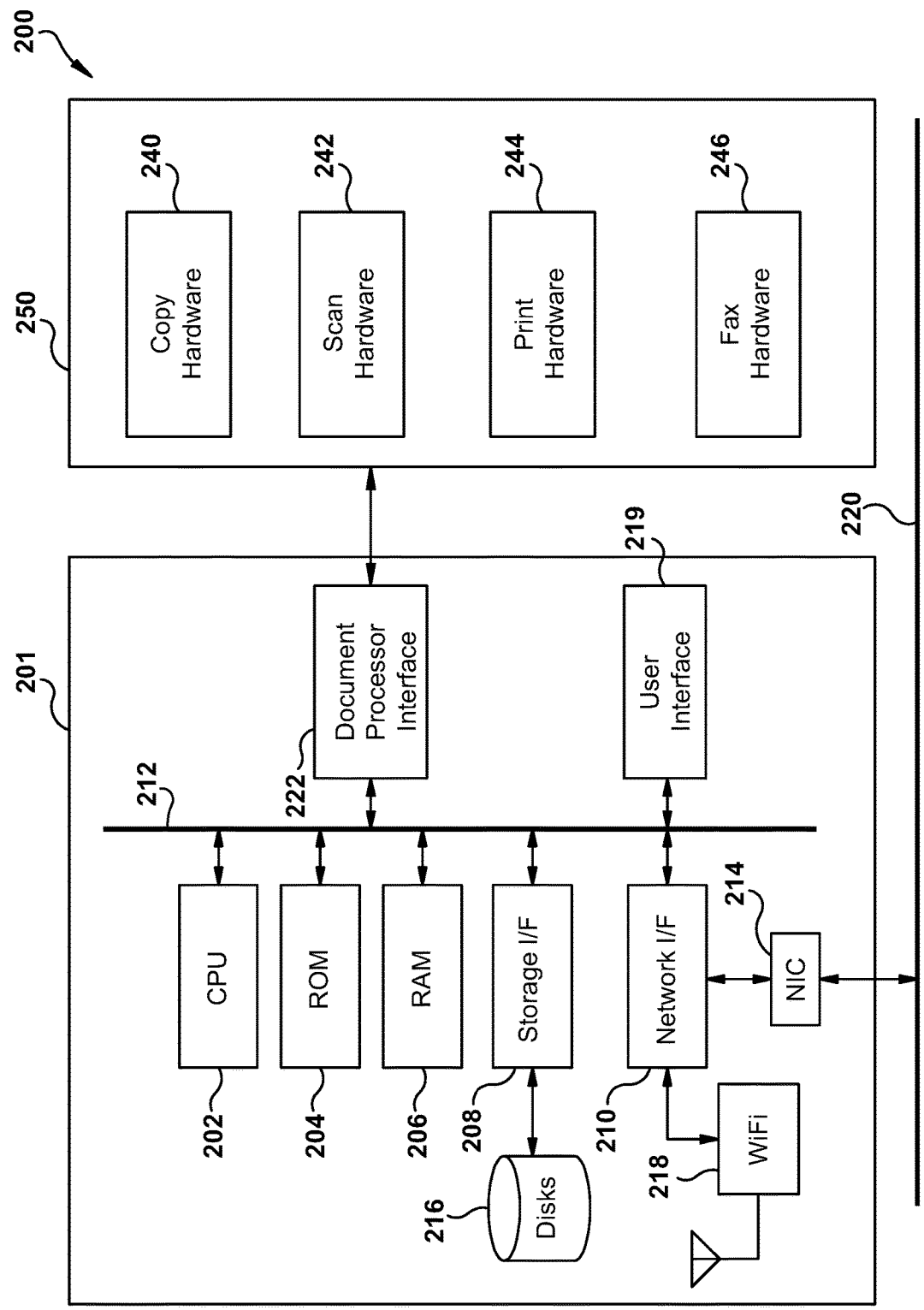
FIG. 2 is an example embodiment of a document rendering system.

Turning now to FIG. 2, illustrated is an example embodiment of a document rendering system 200 suitably comprised within an MFP 110, such as with MFPs 112, and 114 of FIG. 1. Included is controller 201 comprised of one or more processors, such as that illustrated by processor 202. Each processor is suitably associated with non-volatile memory such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Apple Lightning, telephone line, or the like.

Processor 202 can also be in data communication with any suitable user input/output (I/O) interface 219 which provides data communication with user peripherals, such as a front panel display or displays, keyboards, mice, track balls, touch screens, or the like.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250. A hardware monitor suitably provides device event data, working in concert with suitable monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216. It will be understood that functional units are suitably comprised of intelligent units, including any suitable hardware or software platform.

Figure 3:
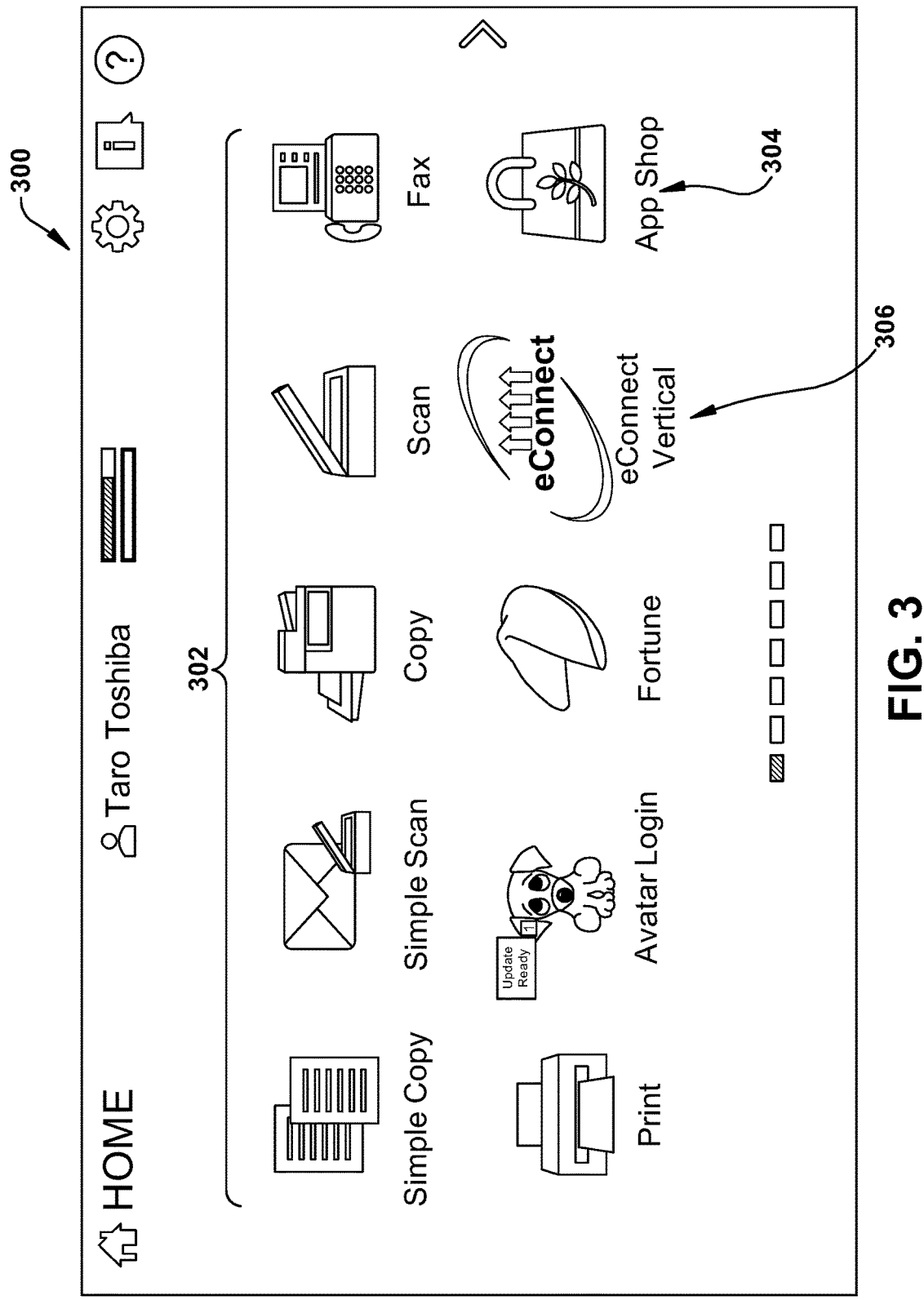
FIG. 3 is an example screenshot of a top level menu of a user interface of an MFP.

FIG. 3 is an example screenshot 300 of a front panel display of an MFP such as MFP 110, 112 or 114 of FIG. 1. The front panel display includes selectable controls 302 for copying, scanning, faxing, printing, and so forth. The selectable controls 302 also include an App Shop control 304 for downloading applications and customized user interfaces from a suitable repository. A user can select the App Shop control 304 to view downloadable items from an associated App Shop, such as the eApp Store 150 of FIG. 1. A downloaded customized user interface control 306, shown as eConnect Vertical, can be selected by the user to display the eConnect Vertical customized user interface on the front panel display of an MFP. Similarly, selecting a different control 302 will cause the application or function associated with the control 302 to execute on the MFP.

Figure 4:
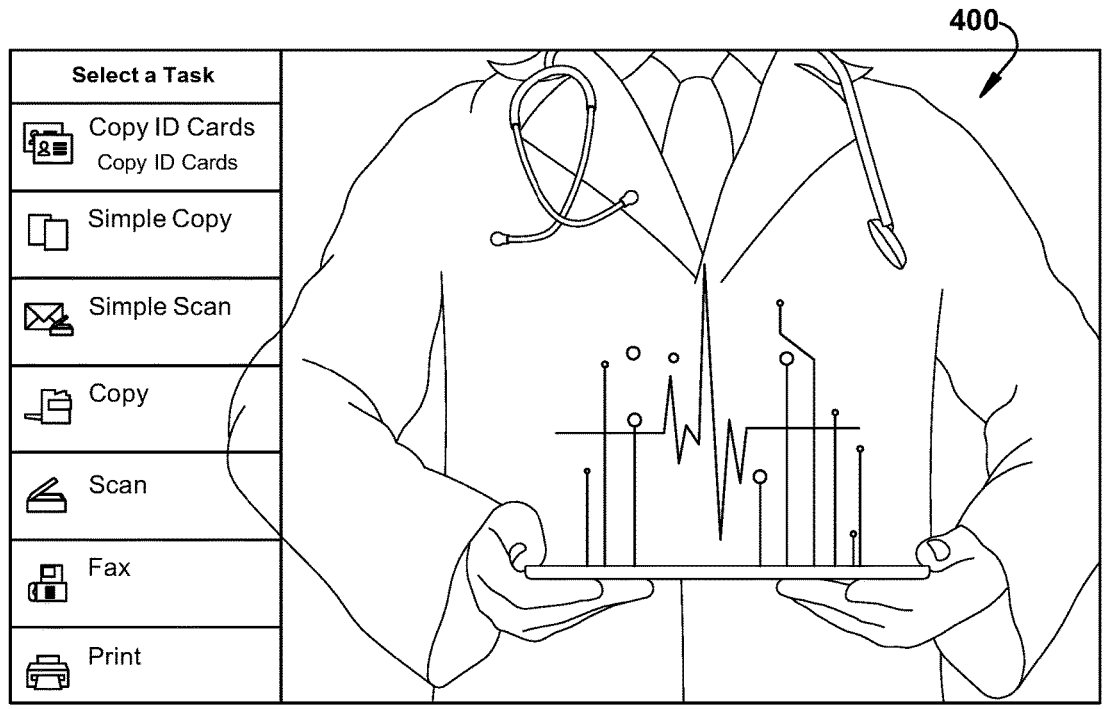
FIG. 4 is an example screenshot of a customized user interface of an MPF.

FIG. 4 is an example screenshot 400 of the front panel display of an MFP. The front panel display of the MFP displays a screen associated with the user selected control 302. For example, the front panel display of the MFP displays a customized user interface, in this case eConnect Vertical, after a user has selected the customized user interface control 306 of FIG. 3. The customized user interface can include tabs for categorizing and organizing controls in a customized menu system, and can include a splash page or logo as illustrated as well as other suitable graphics and text.

Figure 5:
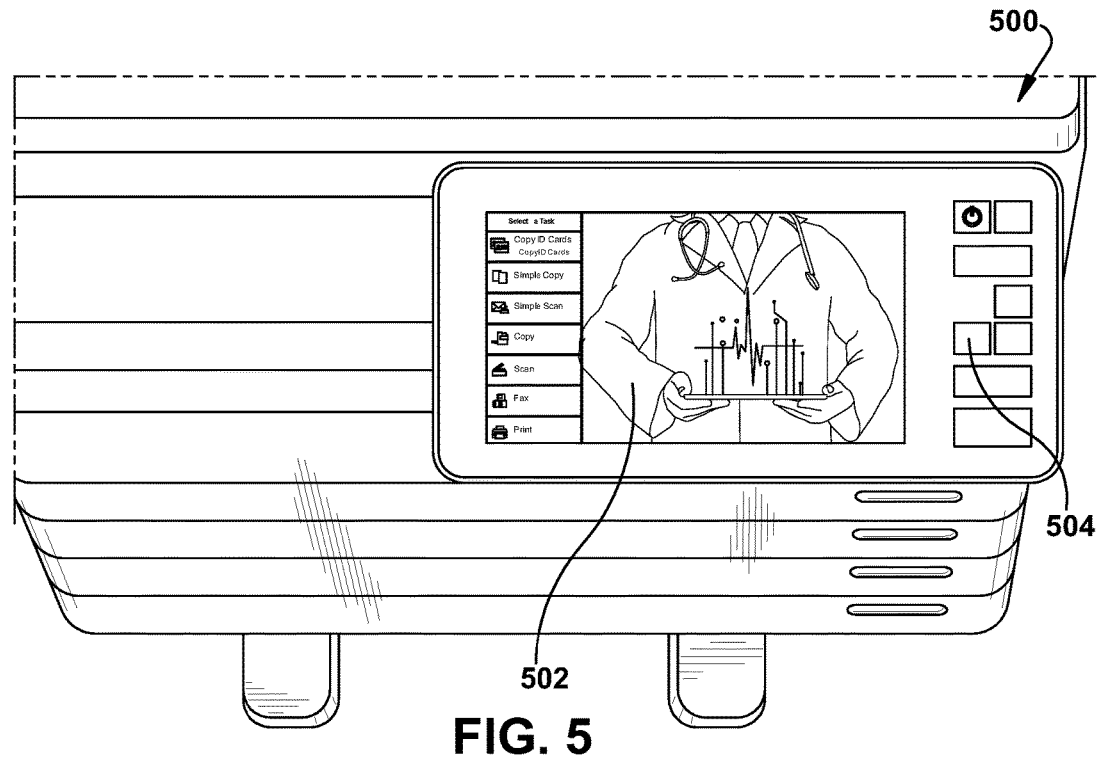
FIG. 5 is diagram of an MFP user interface and associated controls.

FIG. 5 is a diagram of an MFP 500 that includes a front panel display 502. In this example, the front panel display 502 of the MFP 500 displays the customized user interface associated with eConnect Vertical. A user can select a customizable screen capture key 504 to instruct the controller of the MFP 500 to perform a screen capture of what is displayed on the front panel display 502 of the MFP 500. In a configuration, the customizable screen capture key 504 can be selectively enabled or disabled based on the user's credentials. For example, if the user is a system administrator or has supervisory rights, then customizable screen capture key 504 can be enabled. If the user is a typical user without supervisory or administrative rights, then the customizable screen capture key 504 can be disabled.

In an alternative embodiment, the customizable screen capture key 504 can be a software selectable control displayed on the front panel display 502. In this embodiment, the selectable control that functions as the customizable screen capture key 504 is only displayed if the user is an administrator or has supervisory rights. In this embodiment, the selectable control that functions as the customizable screen capture key 504 is not captured as part of the screen capture by the controller of the MFP 500.

Figure 8:
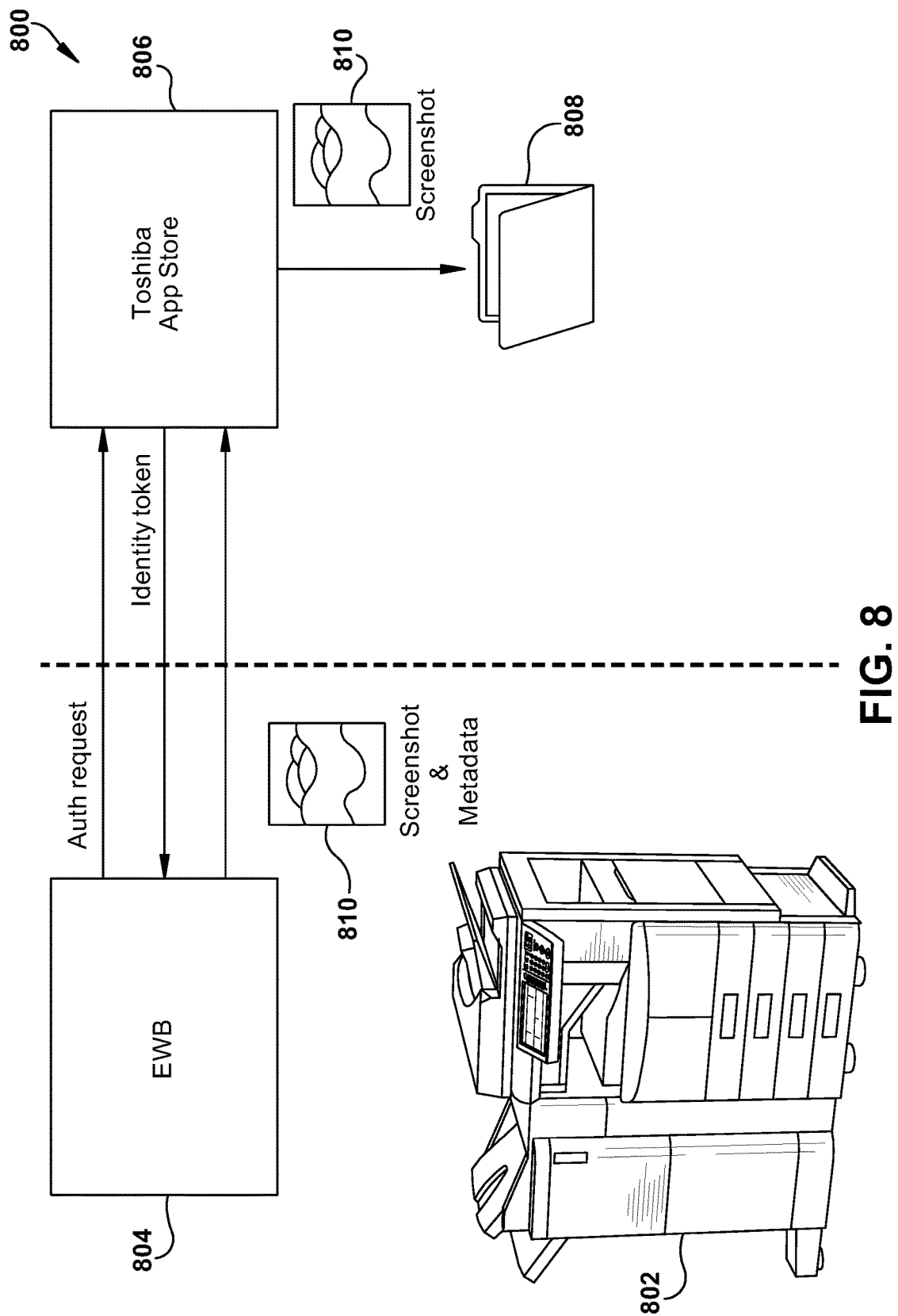
FIG. 8 is a flow diagram of transactions for uploading a captured screenshot to the MFP application store.

Once the user has selected the screen capture button 504, the controller of the MFP 500 uploads the screenshot and associated metadata to the MFP application store, as illustrated in additional detail in FIG. 8 and the accompanying description. The controller will determine if the application or customized user interface is already associated with the MFP application store. If no matching detail page is found, for example if this is the initial release, the user will be prompted to enter the new application name that is used to generate a new details page on the MFP application store.

Figure 6:
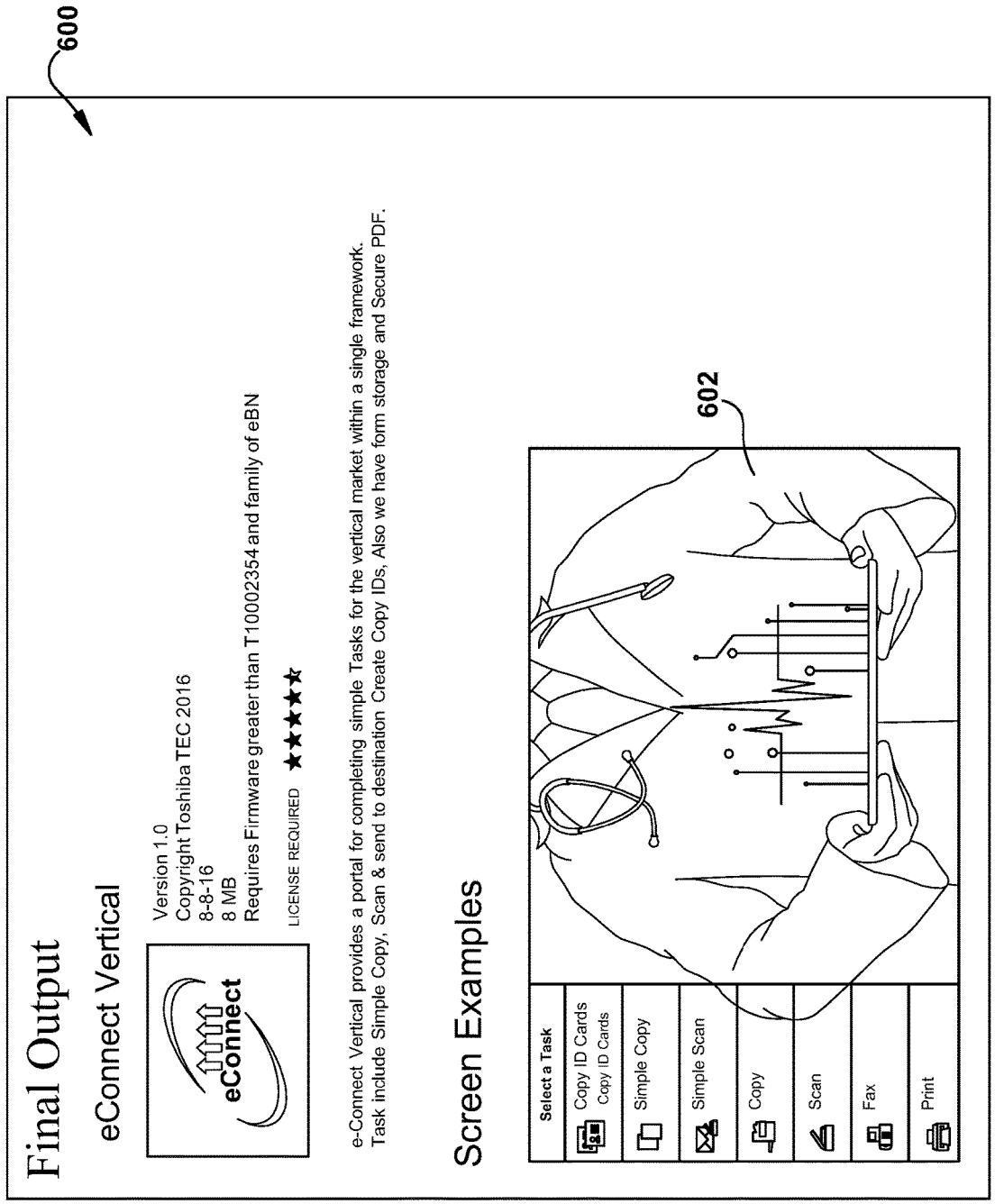
FIG. 6 is an example screenshot from the MFP application store of a detail page associated with the downloadable customized user interface.

In a configuration, once the user has selected the screen capture button 504 to upload the screenshot and metadata to the MFP application store, the controller of the MFP 500 connects the user to the MFP application store which displays the detail page for the downloadable application or customizable user interface associated with the screenshot, for example as illustrated in FIG. 6.

FIG. 6 is an example screenshot 600 from the MFP application store that displays the detail page associated with screenshot 602 taken by the MFP of FIG. 5, illustrated here as the eConnect Vertical customized user interface. The MFP application store can use the metadata transferred by the MFP to determine the detail page of the application or customized user interface associated with the screenshot 602.

Figure 7:
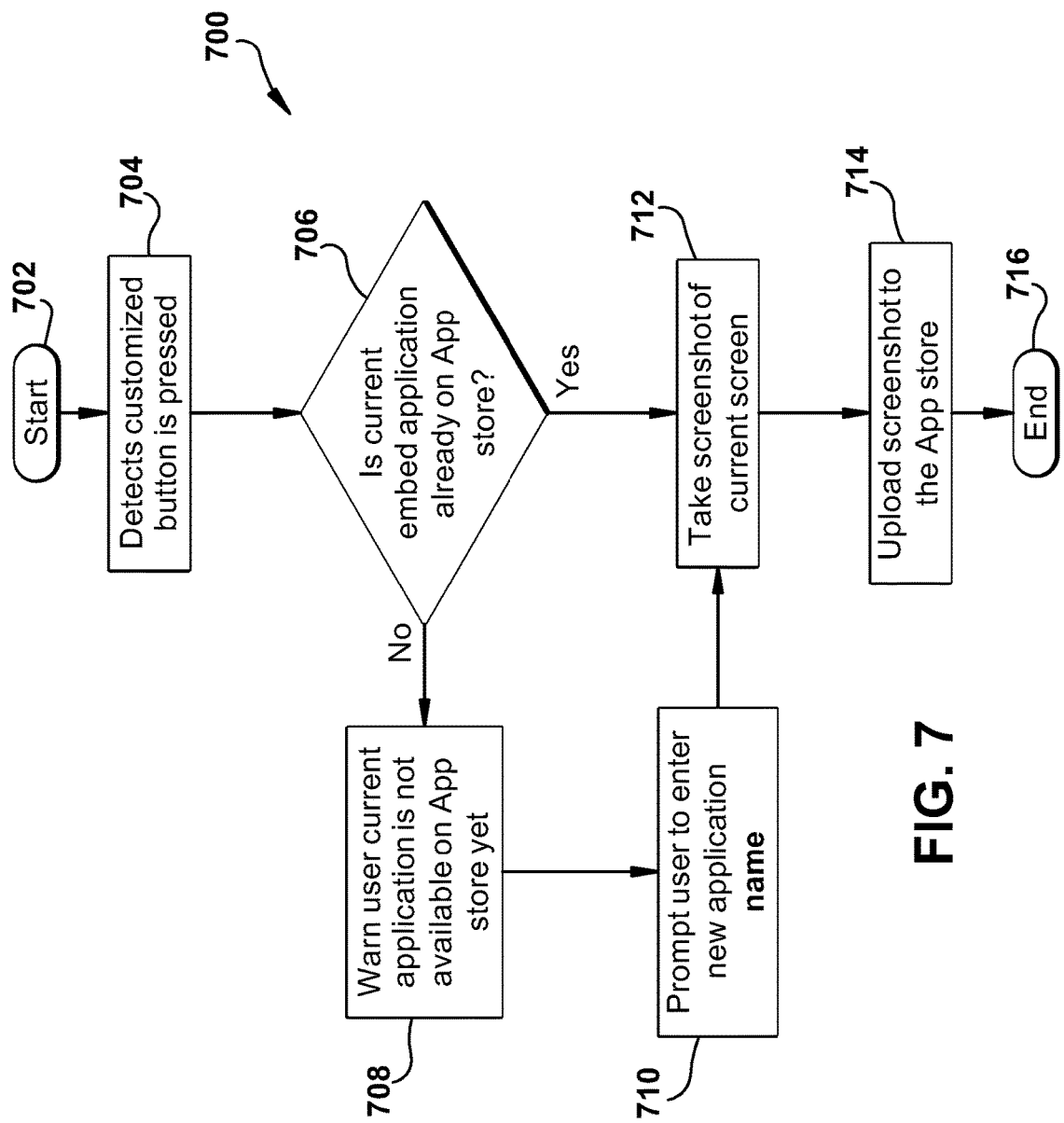
FIG. 7 is a flowchart of example operations for capturing a screenshot of an MFP user interface and uploading the captured screenshot to the associated downloadable application or customized user interface in an MFP application store.

FIG. 7 is a flowchart 700 of example operations for capturing a screenshot on an MFP and uploading the captured screenshot to the associated downloadable application or customized user interface in the MFP application store. Processing starts at process block 702 and proceeds to process block 704.

At process block 704, the MFP detects that the customizable screen capture key has been selected by the user, for example a system administrator or programmer. Processing continues to decision block 706.

At decision block 706, the MFP checks with the MFP application store to determine if the embedded application, for example a downloadable application or customized user interface on the MFP, exists in the MFP application store. If the embedded application does not yet exist in the MFP application store, for example if there is not an associated detail page or downloadable application or customized user interface, then processing continues to process block 708, otherwise if the embedded application exists in the MFP application store then processing continues to process block 712.

At process block 708, the user is warned that the embedded application is not available on the MFP application store. Processing continues to process block 710.

At process block 710, the user is prompted to enter a new name for the embedded application that is executing on the MFP when the user pressed the customizable screen capture key. A detail page for the new embedded application is generated on the MFP application store. Processing continues to process block 712.

At process block 712, a screenshot of the embedded application executing on the MFP is taken. Processing continues to process block 714.

At process block 714, the screenshot and associated metadata is transferred from the MFP to the MFP application store and associated with the detail page associated with the embedded application. Processing then terminates at process block 716.

FIG. 8 is a flow diagram 800 of transactions between the MFP and the MFP application store for uploading captured screenshots. A user, such as a systems administrator or programmer, accesses a user interface displayed on the MFP 802. For example, the controller of the MFP 802 can execute the TOSHIBA Embedded Web Browser, or EWB 804 as the user interface. A suitable web interface can comprise the TOPACCESS Controller available from Toshiba TEC Corporation. The user logs in using their user credentials, and the EWB 804 sends the appropriate authorization request to the MFP application store 806. The MFP application store 806 returns an identity token to the EWB 804 based on the user credentials. The user navigates to the desired screen, for example by selecting an embedded application to execute such as a customized user interface. If the user has supervisory or administrative privileges, then the user can press the appropriate key or soft control on the MFP 802 front panel to trigger the EWB 804 to take a screenshot 810. The screenshot 810 and associated metadata is transferred from the EWB 804 to the MFP application store 806. The MFP application store 806 then stores the screenshot 810 in a folder associated with the detail page associated with the embedded application. The transactions can be sent across any suitable network including a LAN or a WAN such as the Internet.

Figure 9:
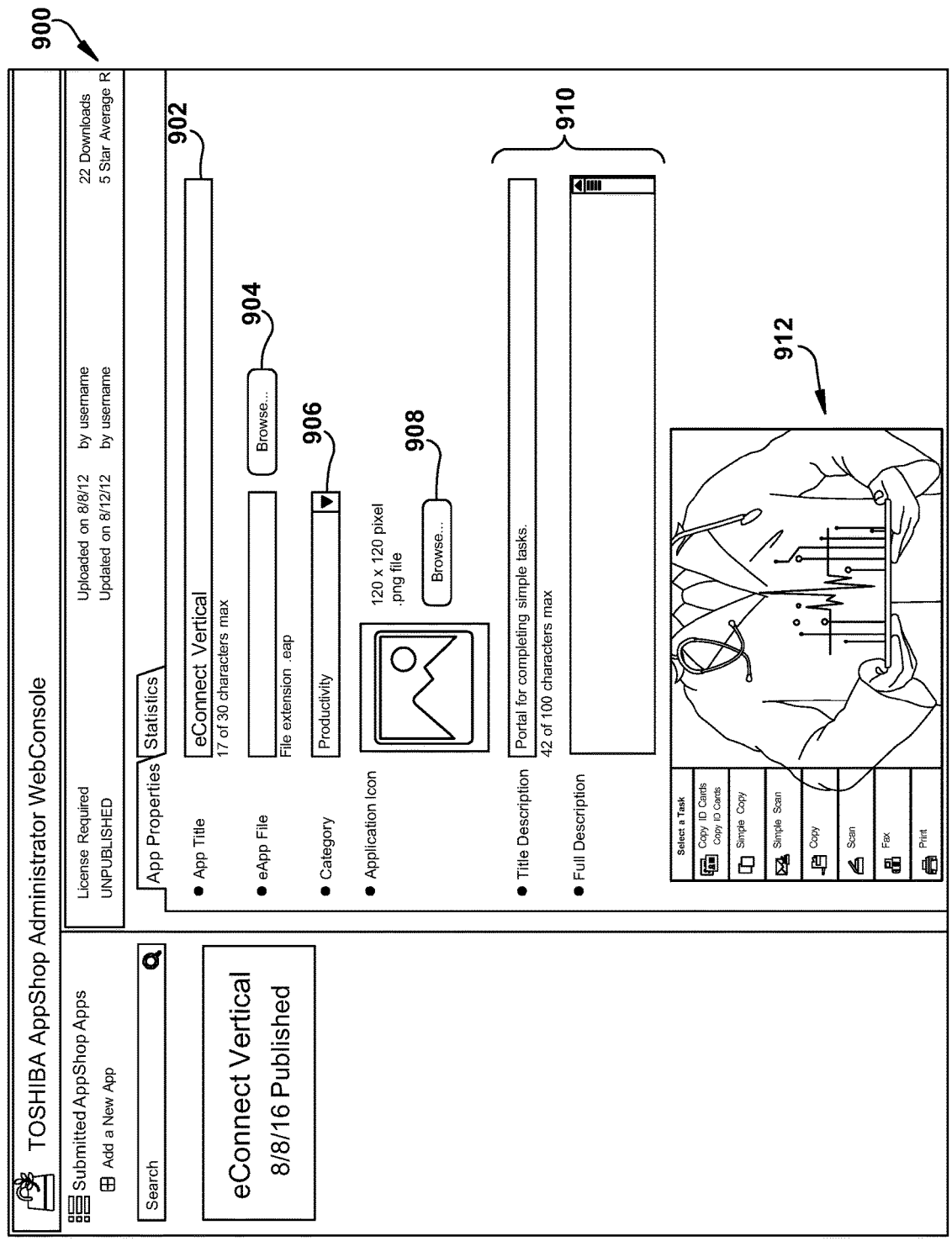
FIG. 9 is an example screenshot of a webpage for configuring downloadable applications and customized user interfaces for MFPs.

FIG. 9 is an example screenshot 900 of a webpage, or console, for configuring applications and customized user interfaces that are available for download via the App Shop of FIG. 4. This can be performed by a system administrator or programmer who configures the downloadable embedded apps available from the App Shop. For example, a system administrator who recently used an MFP to capture a screenshot 912 of a particular embedded app, as describe in detail above, may desire to modify the detail page associated with the app captured on the screenshot 912. Through the webpage or console, the system administrator can provide or modify the title 902 of the app, the file name 904 and file location of the app, a suitable category 906 for the app, and an icon 908 to be represent the app in the App Shop. Other suitable descriptive information 910 such as a description of the app can be added if desired. The administrator can select one more screenshots 912 of the downloadable app to be displayed on the detail page on the MFP application store. The screenshots 912 can show the app as it would be displayed on the MFP front panel display during execution of the app, for example as is illustrated on the front panel display 502 of the MFP 500 of FIG. 5.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:
a network interface configured to communicate with an associated application store;
a display configured to display a plurality of embedded applications;
a first user input configured to receive a user selection of a selected application from the displayed plurality of embedded applications;
a document processing controller including,
a processor configured to execute the selected application in response to the user selection, and
a memory configured to store the plurality of selectable applications for selective execution by the processor;
a print engine configured to print pages in accordance with instructions issued from the controller; and
a second user input configured to receive a user instruction to generate a screenshot of the executing selected application,
wherein the display is further configured to display the executing selected application,
wherein the processor is further configured to generate a screenshot of the displayed executing selected application in response to the received user instruction,
wherein the network interface is further configured to upload the generated screenshot to the application store,
wherein the second user input is configured to be selectively enabled based at least in part on login credentials of a user,
wherein the first user input is further configured to receive the login credentials from the user, and
wherein the network interface is further configured to send an authorization request based on the login credentials to the application store, and
receive a confirmation of the login credentials from the application store, and
wherein the second user input is enabled if the user has administrative privileges and is disabled if the user does not have administrative privileges.

2. The multifunction peripheral of claim 1,
wherein the display includes a touchscreen display, and
wherein the first user input is a software-based control associated with the touchscreen display.

3. The multifunction peripheral of claim 1, wherein the second user input is a physical key associated with the display.

4. The multifunction peripheral of claim 1,
wherein the processor is further configured to generate metadata associated with the screenshot, and
wherein the network interface is further configured to upload the metadata to the application store with the generated screenshot.

5. A multifunction peripheral comprising:
a network interface configured to communicate with an associated application store;
a display configured to display a plurality of embedded applications;
a first user input configured to receive a user selection of a selected application from the displayed plurality of embedded applications;
a document processing controller including,
a processor configured to execute the selected application in response to the user selection, and
a memory configured to store the plurality of selectable applications for selective execution by the processor;
a print engine configured to print pages in accordance with instructions issued from the controller; and
a second user input configured to receive a user instruction to generate a screenshot of the executing selected application, wherein the display is further configured to display the executing selected application, wherein the processor is further configured to generate a screenshot of the displayed executing selected application in response to the received user instruction, wherein the network interface is further configured to upload the generated screenshot to the application store, wherein the processor is further configured to generate metadata associated with the screenshot, wherein the network interface is further configured to upload the metadata to the application store with the generated screenshot, and wherein the application store is configured to receive the generated screenshot and, based at least in part on the metadata, associate the generated screenshot with a detail page for a downloadable application associated with the selected application.

6. The multifunction peripheral of claim 5, wherein the processor is further configured to determine when a detail page associated with the selected application does not exist in the application store, wherein the processor is further configured to query the user, via the display, for entry of information via the first user input for generating the detail page, wherein the metadata uploaded to the application store with the generated screenshot includes the information entered by the user in response to the query, and wherein the application store generates a new detail page associated with the selected application based on the metadata and the screenshot.

7. The multifunction peripheral of claim 5, wherein the application store is further configured to
send the detail page including the generated screenshot to a second multifunction peripheral,
receive, from the second multifunction peripheral, a download request for the downloadable application associated with the detail page, and
download the downloadable application to the second multifunction peripheral.

8. The multifunction peripheral of claim 1, wherein at least one embedded application is a customized user interface for the multifunction peripheral.

9. The multifunction peripheral of claim 1, wherein a user interface displayed on the display is a web page received via the network interface from a web server associated with the application store.

10. A method comprising:
displaying, on a display of a multifunction peripheral, a plurality of selectable embedded applications;
receiving, on a first user input of the multifunction peripheral, a user selection of a selected application from the plurality of selectable applications;
executing, by a processor of the multifunction peripheral, the selected application;
displaying, on the display of a multifunction peripheral, the executing selected application;
receiving, on a second user input of the multifunction peripheral, a user instruction to generate a screenshot of the selected application, wherein the second user input is a physical key;
generating, by the processor, a screenshot of the executing selected application displayed on the display in response to the received user instruction; and
transmitting, via a network interface of the multifunction peripheral, the screenshot to an application store;

receiving, via the first user input, login credentials from a user;
transmitting, via the network interface, and authorization request based on the login credentials to the application store;
receiving, via the network interface, a confirmation of the login credentials from the application store;
selectively enabling the second user input only when the user has administrative privileges; and
selectively disabling the second user input when the user does not have administrative privileges.

11. A method comprising:
displaying, on a display of a multifunction peripheral, a plurality of selectable embedded applications;
receiving, on a first user input of the multifunction peripheral, a user selection of a selected application from the plurality of selectable applications;
executing, by a processor of the multifunction peripheral, the selected application;
displaying, on the display of a multifunction peripheral, the executing selected application;
receiving on a second user input of the multifunction peripheral, a user instruction to generate a screenshot of the selected application;
generating, by the processor, a screenshot of the executing selected application displayed on the display in response to the received user instruction;
transmitting, via a network interface of the multifunction peripheral, the screenshot to an application store;
receiving, by the application store, the screenshot and the metadata;
identifying a detail page associated with the selected application based on the metadata; and
adding the screenshot to the detail page associated with the selected application.

12. The method of claim 11, further comprising:
sending, by the application store, the detail page including the screenshot to a second multifunction peripheral;
receive, from the second multifunction peripheral, a download request for a downloadable application associated with the detail page; and
downloading the application to the second multifunction peripheral.

13. A method comprising:
displaying, on a display of a multifunction peripheral, a plurality of selectable embedded applications;
receiving, on a first user input of the multifunction peripheral, a user selection of a selected application from the plurality of selectable applications;
executing, by a processor of the multifunction peripheral, the selected application;
displaying, on the display of a multifunction peripheral, the executing selected application;
receiving, on a second user input of the multifunction peripheral, a user instruction to generate a screenshot of the selected application;
generating, by the processor, a screenshot of the executing selected application displayed on the display in response to the received user instruction;
transmitting via a network interface of the multifunction peripheral, the screenshot to an application store;
determining, by the processor, when a detail page associated with the selected application does not exist in the application store;

querying the user, via the display, for entry of information via the first user input for generating the detail page when the detail page does not exist in the application store;

adding the entered information into the metadata transmitted to the application store; and generating a new detail page associated with the selected application based on the metadata and the screenshot.

14. A system, comprising:

a multifunction peripheral including a document processing controller configured to store, in memory, applications downloadable from an associated application store, and selectively execute the one or more applications in accordance with user selections, a touchscreen display configured to present the one or more applications stored in memory for selection via an associated input and display, subsequent to the selection, an executing application, a selectively enabled input configured to cause the processor to generate a screenshot of the executing application and metadata identifying the executing application, a network interface configured to transmit the screenshot and the metadata to the associated application store for adding the screenshot to a detail page associated with the executing application, wherein the network interface is further configured to send an authorization request based on user login credentials to the associated application store, and receive a confirmation of the user login credentials from the application store, and wherein the selectively enabled input is enabled if the user has administrative privileges and the selectively enabled input is disabled if the user does not have administrative privileges.

\* \* \* \* \*